(12) United States Patent
Simons

(10) Patent No.: US 7,261,361 B1
(45) Date of Patent: Aug. 28, 2007

(54) VEHICLE UTILITY MAT

(76) Inventor: Matthew L. W. Simons, 5231 Vickery Blvd., Dallas, TX (US) 75206

( * ) Notice: Subject to any disclaimer, the term of this patent is extended or adjusted under 35 U.S.C. 154(b) by 0 days.

(21) Appl. No.: 11/674,486

(22) Filed: Feb. 13, 2007

Related U.S. Application Data

(60) Provisional application No. 60/773,548, filed on Feb. 15, 2006.

(51) Int. Cl.
    *B62D 25/20* (2006.01)
(52) U.S. Cl. .................................................. 296/97.23
(58) Field of Classification Search .............. 296/97.23
    See application file for complete search history.

(56) References Cited

U.S. PATENT DOCUMENTS

| | | | | |
|---|---|---|---|---|
| 2,909,234 A * | 10/1959 | Belk | .............................. | 33/12 |
| 2,970,860 A * | 2/1961 | Belk | .............................. | 33/12 |
| 3,669,817 A * | 6/1972 | McDevitt | ...................... | 428/82 |
| 3,823,058 A * | 7/1974 | Yamaguchi | ................... | 428/85 |
| 4,968,548 A * | 11/1990 | Gibson et al. | ................ | 428/95 |
| 5,806,909 A * | 9/1998 | Wise | .......................... | 296/39.1 |
| 5,830,560 A * | 11/1998 | Koa | ............................. | 428/192 |
| RE36,677 E * | 5/2000 | Reuben | ....................... | 156/219 |
| 6,155,629 A * | 12/2000 | Sherman | .................... | 296/97.23 |
| 6,446,275 B1 * | 9/2002 | Wright et al. | ................ | 4/251.1 |
| 6,455,123 B1 * | 9/2002 | Poe, Sr. | ....................... | 428/102 |
| 6,534,146 B1 * | 3/2003 | Mentz, Jr. | ..................... | 428/95 |
| 6,971,827 B1 * | 12/2005 | Embach | ........................ | 410/97 |

* cited by examiner

*Primary Examiner*—H Gutman
(74) *Attorney, Agent, or Firm*—Michael A. O'Neil

(57) ABSTRACT

A vehicle utility mat comprised of a thermoplastic polymer having a surface for receiving objects to be stored and transported within the cargo areas of vehicles and wherein the vehicle utility mat can be modified to form sidewalls.

1 Claim, 3 Drawing Sheets

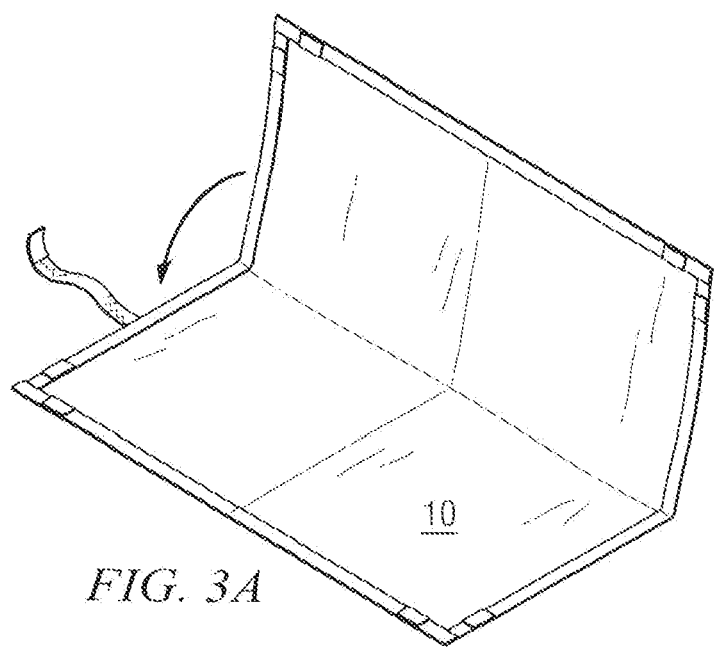
FIG. 3A
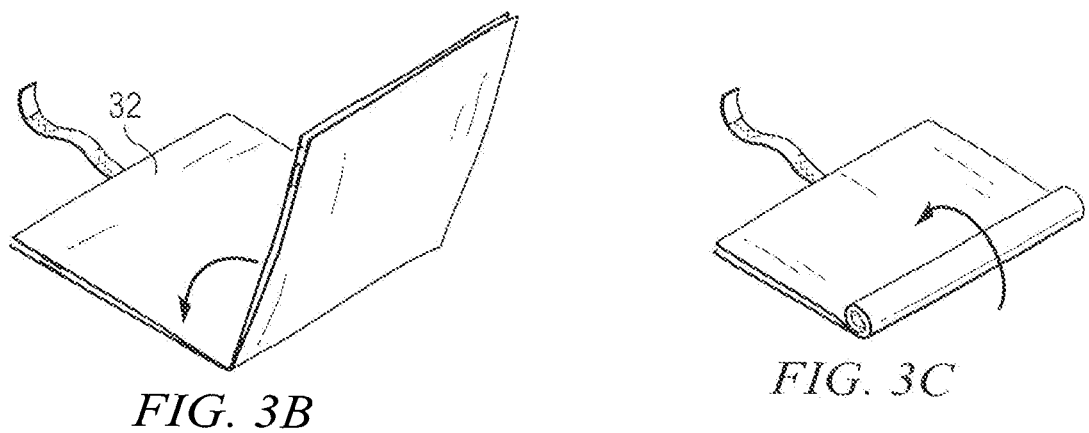
FIG. 3B
FIG. 3C
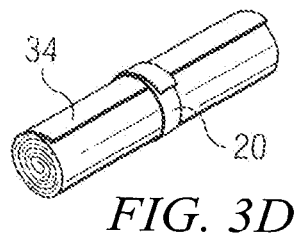
FIG. 3D

VEHICLE UTILITY MAT

CROSS-REFERENCE TO RELATED APPLICATION

Applicant claims priority based on provisional patent application Ser. No. 60/773,548 filed Feb. 15, 2006, the entire content of which is incorporated herein by reference.

TECHNICAL FIELD

This invention relates generally to utility mats, and specifically to utility mats for use in the cargo areas of vehicles.

BACKGROUND AND SUMMARY OF THE INVENTION

It is common for operators of motor vehicles to store and transport various articles in the cargo areas thereof. The types of articles stored and transported in the cargo are of a particular vehicle vary greatly depending in large part on the size of the cargo area but include items as diverse as shrubs, flowers, potting soil, mulch, sod, lumber, hardware, other construction materials, containers filled with plants and other destructive liquids, furniture, tires, tire irons, car jacks, suitcases, bags, boxes, purses, pets, groceries, sporting goods and accessories therefor, etc. Common problems for associated with storing and transporting goods in a vehicular cargo area include damage to the vehicle, particularly the surfaces defining the cargo area and difficulties associated with contained articles within the cargo area.

Indeed, it is well known that manufacturers of vehicles often sell molded liners designed for use within the cargo areas of vehicles to address the foregoing problems. Existing cargo area liners are often very expensive and are not versatile in terms usage because they are rigidly constructed and can only be placed in specific cargo areas (often permanently) in specified ways in order to afford the cargo area protection.

An alternative to the use of manufactured cargo area liners comprises the use of tarps or blankets to protect cargo areas when storing and transporting objects that might damage thereto. Tarps and/or blankets are undesirable solutions to the problems encountered in storing and transporting goods because they tend: not to be made of materials that are easily cleaned after use, not to maintain a flat surface as objects move around upon them, and not to be of a desirable size for use within cargo areas.

The present invention addresses the problems encountered by individuals seeking to store and transport goods within the cargo areas of vehicles and overcomes the foregoing problems inherent in the use of the liners, tarps, and blankets for such proposes. The invention comprises a vehicle utility mat made of a unitary and substantially square section of woven thermoplastic polymer such as polypropylene that is further coated with a thermoplastic polymer such as polypropylene. Thermoplastic polymers are desirable for use as a vehicle utility mats because they are resistant to water, many chemical solvents, tearing, and have high melting points. Furthermore, mats constructed of thermoplastic polymers can be easily washed and air-dried. Additional coating with thermoplastic polymers causes the vehicle utility mat to be even more impervious to liquids.

The vehicle utility mat of this present invention is manufactured to fit most vehicle cargo areas, including both sports utility vehicle cargo areas and car trunks. The mat has a spillage retarding lip extending around its outer periphery created, in one embodiment, by folding the edge of the mat over itself and hemming it.

The vehicle utility mat of the present invention may also be constructed with hook-and-loop fasteners attached to the mat substantially perpendicular to one another at each of the mat's four corners. These fasteners may be secured one to another at each corner to form a partial enclosure resembling a tray that further retards spillage.

The hook-and-loop fasteners can also be used to secure the mat to the carpet typically found in the cargo areas and trunks of vehicles. To do so the mat is turned over so that the hook-and-loop fasteners face downwardly toward the carpet and secure the mat thereto. In this position the mat is secure and will not move about the cargo area or wrinkle when items are placed thereon.

Finally, vehicle utility mats of the present invention are collapsible so that they may be easily stored. The mats have a strap attached adjacent one corner that is used to wrap around and secure the mat once the mat is folded and rolled into a substantially cylindrical shape. The strap secures the mat through the use of hook-and-loop fasteners.

BRIEF DESCRIPTION OF THE DRAWINGS

A more complete understanding of the present invention may be had by reference to the following Detailed Description when taken in connection with the accompanying Drawings, wherein:

FIGS. 3A, 3B, 3C, and 3D are perspective views illustrating the steps involved in storing the vehicle utility mat of the present invention.

DETAILED DESCRIPTION

Figure 1:
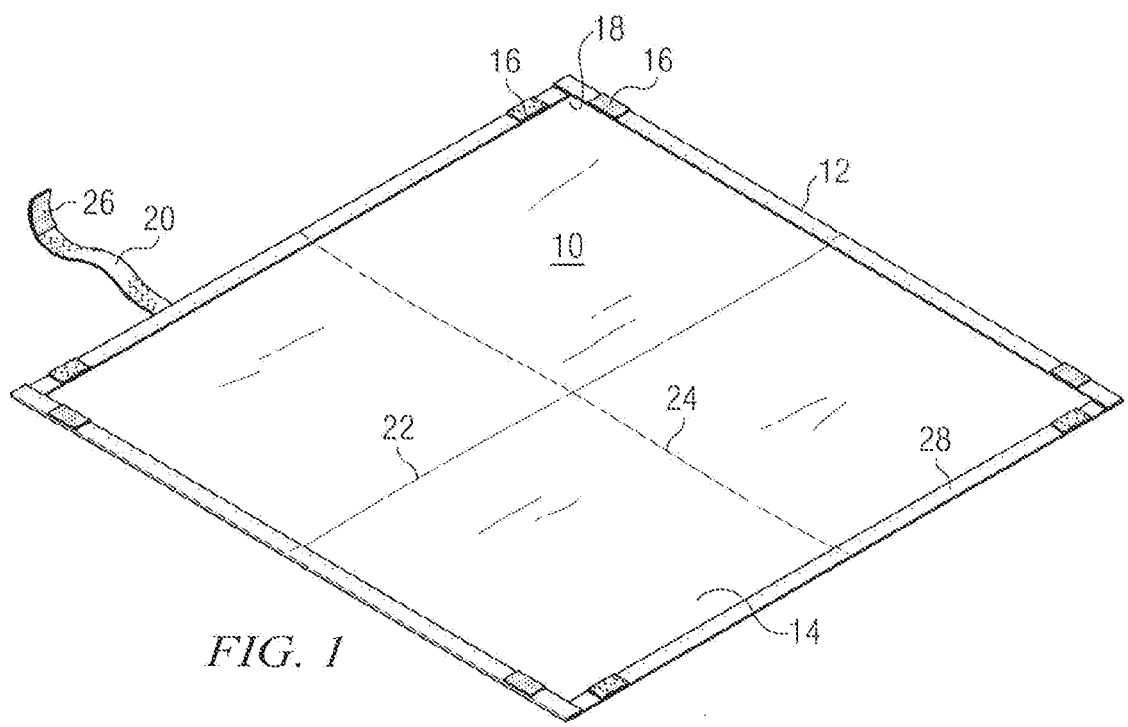
FIG. 1 is a perspective view illustrating the vehicle utility mat of the present invention.

Referring to the drawings, and in particular to FIG. 1, there is shown a vehicle mat 10 comprising a first embodiment of the invention. The vehicle utility mat 10 has four coequal sides 12 forming a square surface 14. The vehicle utility mat 10 has four sets of hook-and-loop fasteners 16 positioned substantially adjacent each of the four corners 18 of the square surface 14 of the vehicle utility mat 10. A strap 20 is shown attached to the vehicle utility mat 10 adjacent to one of the corners 18 for securing the vehicle utility mat when it is folded about its two center axes 22 and 24 and rolled to form a cylinder. The strap 20 uses a set of hook-and-loop fasteners 26 to secure the vehicle utility mat 10 once it has been folded and rolled as explained. Finally, a lip 28 formed about the perimeter of the square surface 14 of the vehicle utility mat 10 for retarding spillage of liquid or other flowable substances.

Figure 2:
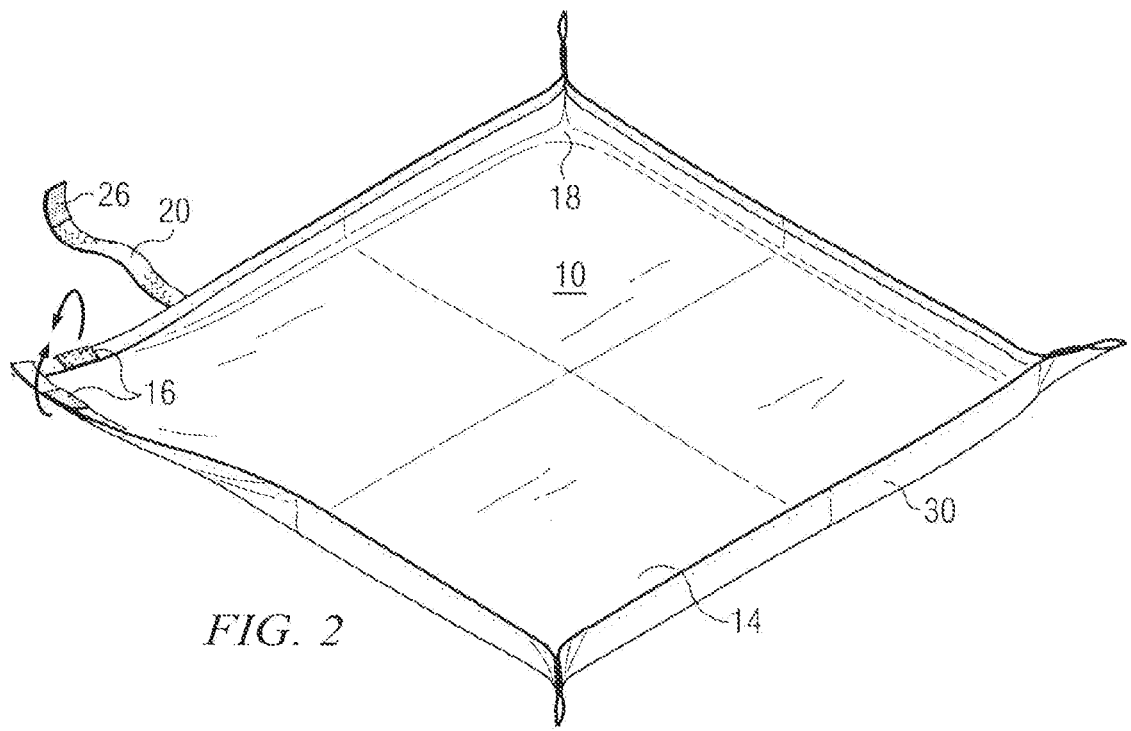
FIG. 2 is a perspective view illustrating the vehicle utility mat in a different configuration.

In FIG. 2 the vehicle utility mat 10 is shown modified to form a tray having sidewalls 30 constraining flowable substances and small objects within the borders of the square surface 14. The sidewalls 30 are formed by attaching the hook-and-loop fasteners 16 at the four corners 18 of the square surface 14 in the manner illustrated.

FIGS. 3A, 3B, 3C, and 3D show the steps involved in storing the vehicle utility mat 10. The vehicle utility mat 10 is folded up into a smaller square 32 as shown in FIGS. 3A and 3B and is then rolled into a substantially cylindrical shape 34 as shown in FIGS. 3C and 3D and secured with the strap 20 as shown in FIG. 3D. The substantially cylindrical shape 34 as secured with the strap 20 can be easily stored or transported.

Figure 4:
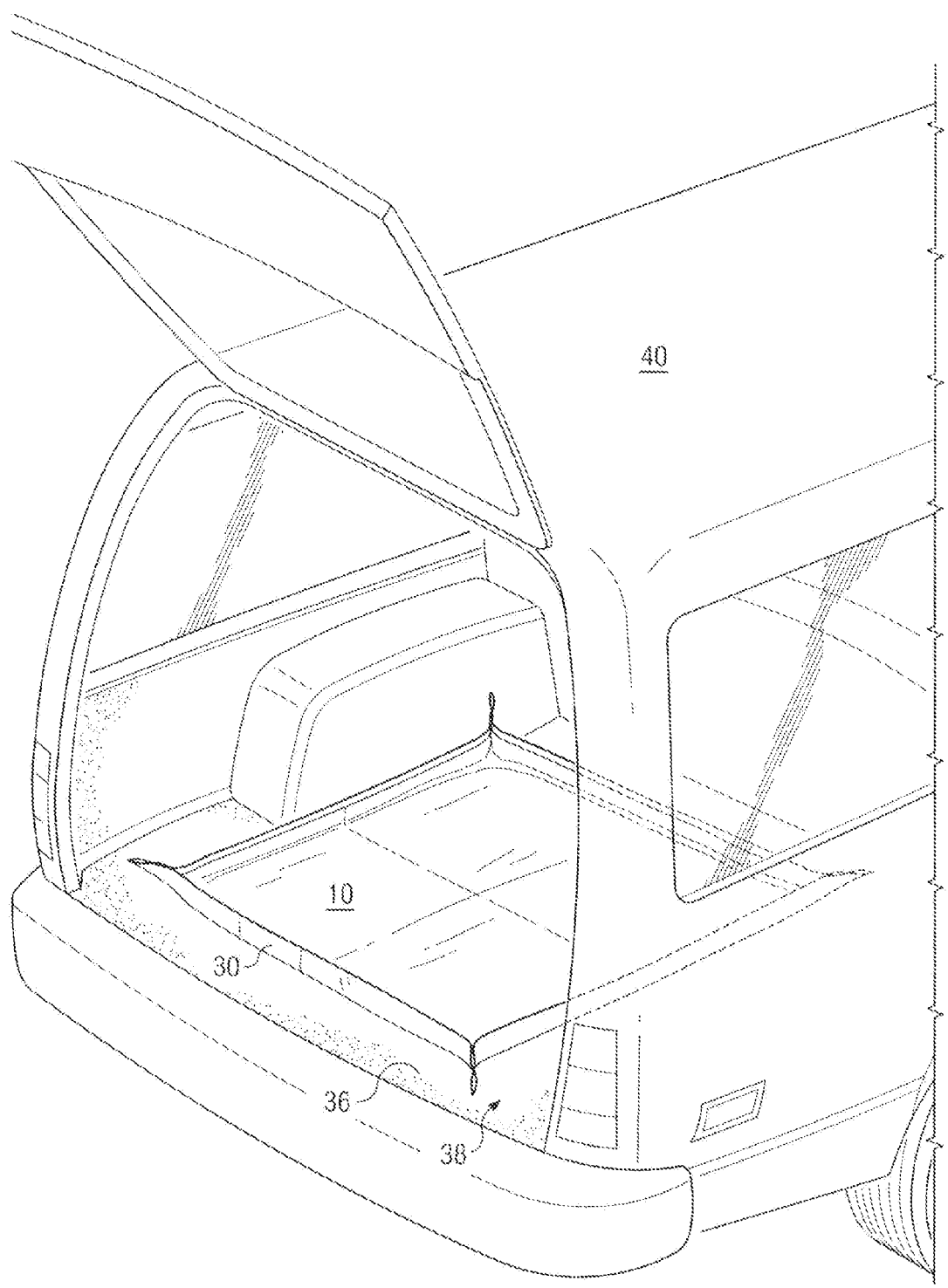
FIG. 4 is a perspective view illustrating the vehicle utility mat of the present invention positioned within the cargo area of a sports utility vehicle.

FIG. 4 illustrates the vehicle utility mat 10 embodying a tray formed by the sidewalls 30 positioned on the floor 36 of a cargo area 38 of a sports-utility vehicle 40 for use in transporting goods from one place to another.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A utility mat for use in a cargo area of a vehicle comprising:

a rectangular sheet having four sides and four corners and comprising a woven thermoplastic sheet defining a surface and a continuous thermoplastic layer extending across the entirety of the surface defined by the woven thermoplastic sheet;

the four sides of the rectangular sheet being folded inwardly and secured to the surface comprising the woven thermoplastic sheet and the thermoplastic layer thereby defining a lip extending around the entire periphery of the rectangular sheet;

four sets of hook-and-loop fasteners each secured at one of the corners of the rectangular sheet for securing portions of the four sides thereof in upright orientations relative to the surface comprising the woven thermoplastic sheet and the thermoplastic layer; and a strap secured to the rectangular sheet and comprising hook-and-loop fasteners for securing the rectangular sheet in a folded and rolled configuration.

* * * * *

UNITED STATES PATENT AND TRADEMARK OFFICE
CERTIFICATE OF CORRECTION

| | |
|---|---|
| PATENT NO. | : 7,261,361 B1 |
| APPLICATION NO. | : 11/674486 |
| DATED | : August 28, 2007 |
| INVENTOR(S) | : Simons |

It is certified that error appears in the above-identified patent and that said Letters Patent is hereby corrected as shown below:

IN THE SPECIFICATION

Col. 1, line 20, replace "cargo are of" with -- cargo area of --.
Col. 1, line 27, replace "Common problems for" with -- Common problems --.
Col. 1, line 36, replace "terms usage because" with --- terms of usage, because --.
Col. 1, line 43, replace "might damage" with -- might cause damage --.
Col. 1, line 59, replace "use as a vehicle" with -- use as vehicle --.
Col. 2, line 19, replace "adjacent one corner" with -- adjacent to one corner --.
Col. 2, line 48, replace "adjacent each of" with -- adjacent to each of --.
Col. 2, line 56, replace "a lip 28 formed" with -- a lip 28 is formed --.

Signed and Sealed this

Fourth Day of December, 2007

JON W. DUDAS
*Director of the United States Patent and Trademark Office*